United States Patent
Yang (10) Patent No.: US 10,196,305 B1
(45) Date of Patent: Feb. 5, 2019

(54) VACUUM REPAIRING TOOL USED FOR CRACK/SEAM ON SURFACE OF OBJECT

(71) Applicant: Shenzhen ZhiZong SiHai Technology Co., Ltd., Longgang District, Shenzhen (CN)

(72) Inventor: Yunliang Yang, Guizhou (CN)

(73) Assignee: SHENZHEN ZHIZONG SIHAI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/869,936

(22) Filed: Jan. 12, 2018

(30) Foreign Application Priority Data

Nov. 10, 2017 (CN) .......................... 2017 1 1113198
Nov. 10, 2017 (CN) ...................... 2017 2 1512916 U (51) Int. Cl.
*C03C 27/06* (2006.01)
(52) U.S. Cl.
CPC .................................... *C03C 27/06* (2013.01)
(58) Field of Classification Search
CPC combination set(s) only.
See application file for complete search history.

(56) References Cited

U.S. PATENT DOCUMENTS

| | | | | |
|---|---|---|---|---|
| 3,562,366 A | * | 2/1971 | Shol ...................... | B29C 73/025 264/162 |
| 3,993,520 A | * | 11/1976 | Werner ................. | B29C 73/025 156/94 |
| 4,047,863 A | * | 9/1977 | McCluskey ........... | B29C 73/025 156/94 |
| 4,200,478 A | * | 4/1980 | Jacino ..................... | B29C 73/00 156/102 |
| 4,280,861 A | * | 7/1981 | Schwartz .............. | B29C 73/025 156/382 |
| 4,385,015 A | * | 5/1983 | Klettke ................. | B29C 73/025 156/286 |
| 4,776,780 A | * | 10/1988 | Banks ................... | B29C 73/025 156/285 |
| 4,820,148 A | * | 4/1989 | Anderson ............. | B29C 73/025 156/382 |
| 4,840,551 A | * | 6/1989 | Lay ....................... | B29C 73/025 156/94 |
| 4,919,602 A | * | 4/1990 | Janszen ................. | B29C 73/025 156/94 |

(Continued)

*Primary Examiner* — Sing P Chan
(74) *Attorney, Agent, or Firm* — Chun-Ming Shih (57) ABSTRACT

A vacuum repairing tool for a crack/seam on surface of an object includes an injector for extracting air and injecting glue, and a sticky pad for fixing on an object surface. A perfusion repairing area corresponding to the crack/seam and glue applying areas for applying glue are arranged on the bottom surface of the sticky pad, and the glue applying areas are on the outer sides of the perfusion repairing area. The injector is provided with a needle. The invention can forcibly perfuse the repairing liquid into the crack/seam by external force in the vacuum state, so as to ensure the sufficient and uniform perfusion of repairing liquid without blind space, it even isolates the contact of the glued space with the outside to realize the genuine dust-free operation, thus it solves the long-existing universal difficulty that the crack/seam on surface of object can't be fully and seamlessly repaired.

10 Claims, 5 Drawing Sheets

(56) References Cited

U.S. PATENT DOCUMENTS

| | | | | |
|---|---|---|---|---|
| 4,919,603 A * | 4/1990 | Herold | ............. | B29C 73/025 156/286 |
| 4,919,986 A * | 4/1990 | Lay | ............. | B29C 73/025 248/205.5 |
| 4,954,300 A * | 9/1990 | Dotson | ............. | B29C 73/025 156/499 |
| 4,975,037 A * | 12/1990 | Freiheit | ............. | B29C 73/025 156/94 |
| 5,104,304 A * | 4/1992 | Dotson | ............. | B29C 73/025 156/94 |
| 5,156,853 A * | 10/1992 | Werner | ............. | B29C 73/025 156/285 |
| 5,209,935 A * | 5/1993 | Jacino | ............. | B29C 73/025 156/94 |
| 5,591,460 A * | 1/1997 | Wanstrath | ............. | B29C 73/025 264/36.21 |
| 5,622,726 A * | 4/1997 | Tanner | ............. | B29C 73/025 264/36.21 |
| 5,837,294 A * | 11/1998 | Shrimpton | ............. | B29C 73/025 425/12 |
| 5,897,882 A * | 4/1999 | Gonzalez | ............. | B29C 73/025 156/382 |
| 6,215,955 B1 * | 4/2001 | Sloan | ............. | B29C 73/34 219/202 |
| 6,338,619 B1 * | 1/2002 | Rusch | ............. | B29C 73/025 156/94 |
| 6,589,036 B1 * | 7/2003 | Rawlins | ............. | B29C 73/025 425/12 |
| 7,993,121 B1 * | 8/2011 | Chan | ............. | B29C 73/025 264/36.21 |
| 8,721,311 B2 * | 5/2014 | Thomas | ............. | B29C 73/166 156/94 |
| D720,589 S * | 1/2015 | Thomas | ............. | D8/51 |
| 8,939,994 B2 * | 1/2015 | Gotte | ............. | A61B 17/00234 606/130 |

* cited by examiner

VACUUM REPAIRING TOOL USED FOR CRACK/SEAM ON SURFACE OF OBJECT

BACKGROUND OF THE INVENTION

1. Technical Field

The invention belongs to the technical field of repair for cracks and seams on the surface of objects, in particular to a vacuum repairing tool used for crack/seam on surface of object.

2. Description of Related Art

Glass and other object surfaces often cracks in case of impact or collision; in the prior art, when the cracks/seams on glass and other object surfaces is repaired, the cracks of glass can only be manually repaired by the professionally trained technicians; besides, when the existing repairing tools are used for repair the crack/seam, the repairing liquid is directly injected into the crack/seam through an injector, but owing to the too small gap of the crack/seam and the air left inside, it results in that the glass repairing liquid can't completely penetrate to the bottom of the crack/seam to lead to the poor repairing effect of the crack/seam.

SUMMARY OF THE INVENTION

In order to solve the above problem, the invention aims to provide a vacuum repairing tool used for crack/seam on surface of object; it can ensure the sufficient and uniform perfusion of repairing liquid without blind space, it also isolates the contact of the glued space with the outside to realize the genuine dust-free operation, so as to solve the long-existing universal difficulty that the crack/seam on the surface of object can't be fully and seamlessly repaired; besides, it has the advantages of simple structure, convenient operation, low cost, etc.

The invention adopts the technical scheme that:

A vacuum repairing tool used for crack/seam on surface of object comprises an injector used for extracting air and injecting glue and a sticky pad used for fixing on the object surface; a perfusion repairing area corresponding to the crack/seam on the surface of object and glue applying areas used for applying glue are arranged on the bottom surface of the sticky pad, and the glue applying areas are on the outer sides of the perfusion repairing area; the injector is provided with a needle used for puncturing the sticky pad and in close fit with the sticky point.

Further, the sticky pad comprises a saucer and/or a gasket.

The glue applying areas are arranged on the two opposite sides of the perfusion repairing area on the bottom surface of the gasket, respectively; the glue applying areas of the gasket are provided with strip-shaped grooves used for filling glue, and the strip-shaped grooves are arranged in the length direction of the gasket.

A glue perfusing part in tight fit with the needle of the injector is arranged on the top surface of the saucer in the position corresponding to the perfusion repairing area on the bottom surface of the saucer; annular grooves are arranged in the glue applying areas on the bottom surface of the saucer, and the annular grooves are peripherally distributed along the perfusion repairing area of the saucer.

Further, bulged lines are also arranged on the bottom surface of the saucer; the bulged lines are peripherally distributed along the perfusion repairing area of the saucer, and the bulged lines are concentrically arranged with the annular grooves.

Further, the glue perfusing part comprises a saucer sleeve and a valve core; the saucer sleeve is fixedly arranged on the top surface of the saucer, and is provided with a through hole communicated with the perfusion repairing area of the saucer; the valve core is arranged in the through hole, and is in sealing connection with the sealed sleeve.

Further, the annular grooves comprise a first annular groove, a second annular groove and a third annular groove in concentric distribution from the inner ring to the outer ring in order; the bulged lines comprise a first bulged line and a second bulged line; the first bulged line is arranged between the first annular groove and the glue perfusing part, and the second bulged line is arranged between the first annular groove and the second annular groove.

Further, the gasket is rectangular; the saucer is in the shape of a circular disk; the annular grooves and the bulged lines are all in the shape of a circular ring; and the centers of annular grooves and the bulged lines are all in the position of the center of the saucer.

Further, the annular grooves and the strip-shaped grooves are all 2 mm wide and 0.5 mm deep; the bulged lines are 1 mm deep and 0.5 mm high.

Further, the saucer has the diameter length of 10 cm and thickness of 2 mm; the first bulged line has the diameter length of 3 cm, and the second bulged line has the diameter length of 6 cm; the first annular groove has the diameter length of 46 mm, the second annular groove has the diameter length of 75.5 mm, and third annular groove has the diameter length of 88.5 mm.

Further, the vacuum repairing tool used for crack/seam on surface of object also comprises an adhesive film used for adhering on the object surface.

Further, the adhesive film is a transparent plastic film with back glue; the gasket and the saucer are both made of semi-transparent silica gel or rubber materials, respectively.

Further, the vacuum repairing tool used for crack/seam on surface of object also comprises a jacking device used for jacking the object back to split the crack/seam on surface of object.

The invention has the advantages that:

For the vacuum repairing tool used for crack/seam on surface of object provided by the invention, since it can forcibly perfuse the repairing liquid into the crack and seam by external force in the vacuum state, it can ensure the sufficient and uniform perfusion of repairing liquid without blind space, it even isolates the contact of the glued space with the outside to realize the genuine dust-free operation, thus it solves the long-existing universal difficulty that the crack/seam on surface of object can't be fully and seamlessly repaired, and it is a major breakthrough in the repair technology of crack/seam on surface of object; besides, it also has the advantages of simple structure, convenient operation, low cost, etc., and has a good value of popularization and use.

BRIEF DESCRIPTION OF THE DRAWINGS

In order to describe the embodiments of the invention or the technical schemes in the prior art more clearly, and the drawings necessary for describing the embodiments or the prior art will be simply introduced next; obviously, the drawings in the following description are only some embodiments of the invention, and for the common technicians of the field, other drawings can also be obtained according to these drawings under the premise without creative labor.

DETAILED DESCRIPTION OF THE INVENTION

In order to make the purpose, technical scheme and advantages of the invention much clearer, the technical schemes of the invention will be described in details below. Obviously, the embodiments described here are only partial embodiments of the invention, but not all the embodiments. Based on the embodiments in the invention, all the other embodiments obtained by the common technicians of the field under the premise without creative work are within the protected range of the invention.

Embodiment 1

The embodiment provides a vacuum repairing tool used for crack/seam on surface of object, which an injector 109 used for extracting air and injecting glue and a sticky pad used for fixing on the surface of an object 111; a perfusion repairing area 115 corresponding to the crack/seam on the surface of object 111 and glue applying areas used for applying glue are arranged on the bottom surface of the sticky pad, and the glue applying areas are on the outer sides of the perfusion repairing area 115; the injector 109 is provided with a needle 110 used for puncturing the sticky pad and in close fit with the sticky point.

For the vacuum repairing tool used for crack/seam on surface of object based on the above structure, firstly, the adhesive glue 112 is applied on the glue applying areas, so as to adhere and cement the sticky pad to the surface of the object 111, so that the perfusion repairing area 115 on the bottom surface of the sticky pad can be placed at the crack/seam on the surface of object 111, and the perfusion repairing area 115 can be formed into a closed space resistant to high pressure; then, the perfusion repairing area 115 is pumped by penetrating the needle 110 of the injector 109 into the perfusion repairing area 115 to pump the perfusion repairing area 115 into a vacuum state; after the needle 110 of the injector 109 filled with repairing liquid 113 is penetrated into the perfusion repairing area 115, the repairing liquid 113 in the injector 109 is forcibly and uniformly perfused into the perfusion repairing area 115; therefore, the repairing liquid 113 can be forcibly perfused into the seam and crack by external force in the vacuum state, as a result, it can ensure the sufficient and uniform perfusion of repairing liquid 113 without blind space, it even isolates the contact of the glued space with the outside to realize the genuine dust-free operation, accordingly it solves the long-existing universal difficulty that the crack/seam on the surface of object 111 can't be fully and seamlessly repaired; besides, and it is a major breakthrough in the repair technology of crack/seam on surface of object 111; besides, compared with the existing repairing tools for crack/seam on surface of object, it also has the advantages of simple structure, convenient operation, low cost, etc., and with the structural and technical breakthroughs, it has a good value of popularization and use.

On completion of perfusing the repairing liquid 113, in order to accelerate the repairing liquid 113 to permeate into the crack/seam in the perfusion repairing area 115, air can also be perfused into the perfusion repairing area 115 by using the injector 109 for pressurization, which can be repeated for several times, so that the repairing liquid 113 in the perfusion repairing area 115 can be pressed into the crack/seam, and it is good for accelerating the permeation of the repairing liquid 113.

Preferably, grooves for applying adhesive glue 112 are arranged in glue applying areas on the bottom surface of the sticky pad, so that it is convenient applying the adhesive glue 112 in the grooves to increase the adhesive and cementing strength between the saucer 101 and the surface of object 111; preferably, the adhesive glue applied in the grooves shall be 3 mm higher than the grooves.

Optimally, bulged lines are also arranged on the bottom surface of the sticky pad, so that the bulged lines can effectively prevent the repairing liquid 113 in the perfusion repairing area 115 from flowing into other areas to avoid wasting the repairing liquid 113.

Wherein, the sticky pad comprises a saucer 101, so that the saucer 101 can better repair the bull-eye-like cracks, star-like cracks, cross cracks, reticular cracks, curved cracks, short-line cracks and other curved and straight cracks.

Figure 1:
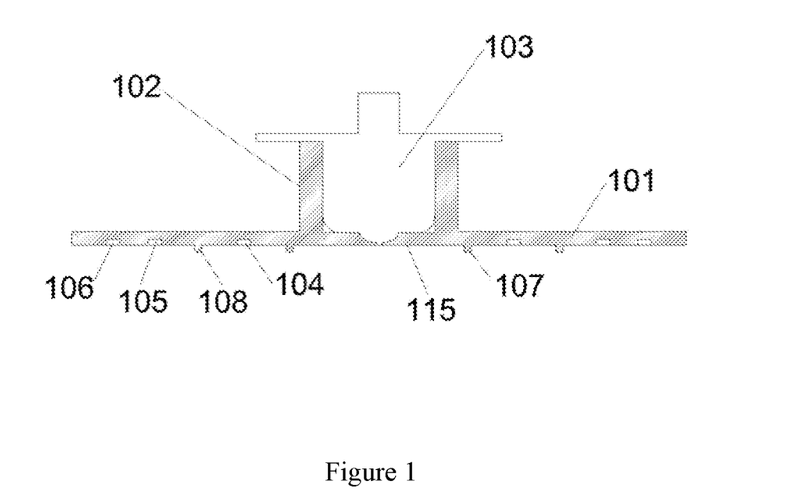
FIG. 1 shows the structural diagram of partial section view of the saucer in Embodiment 1.
Figure 2:
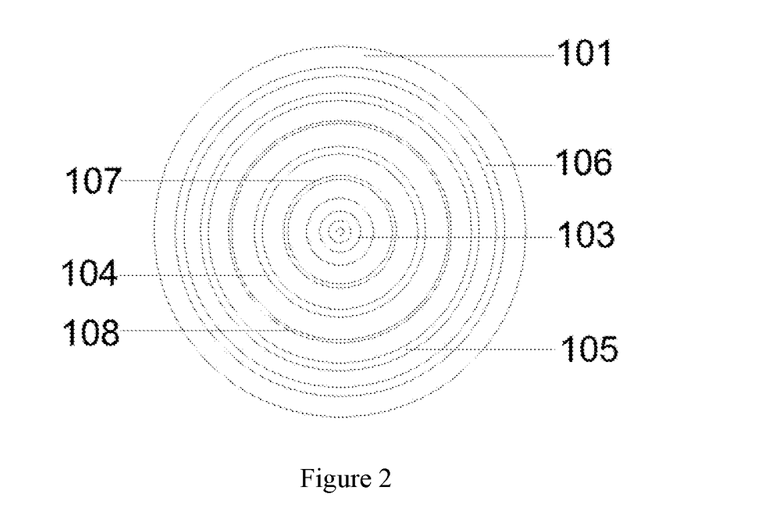
FIG. 2 shows the upward view of the saucer in Embodiment 1.
Figure 3:
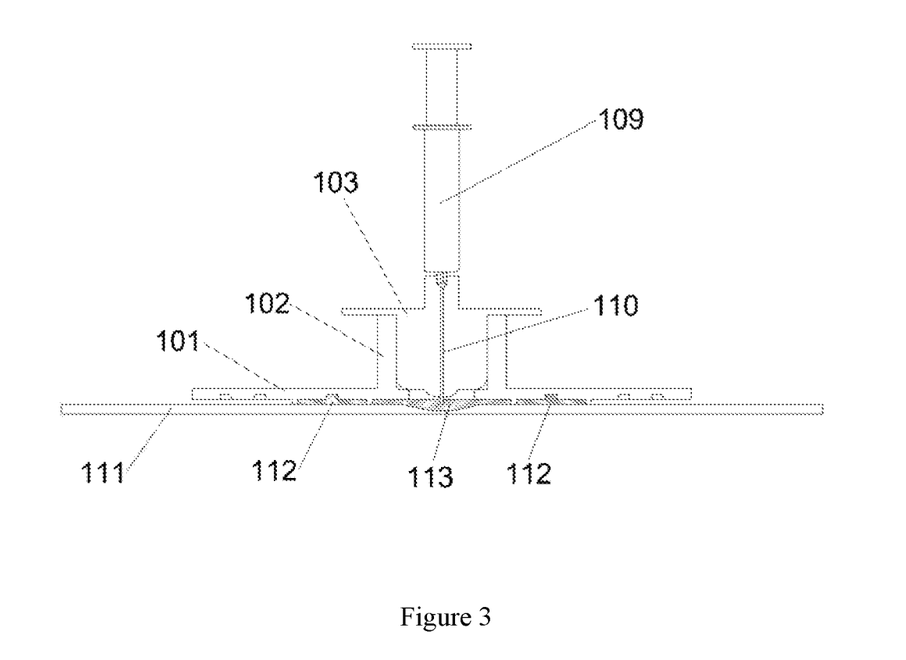
FIG. 3 shows the schematic diagram for the using state of the vacuum repairing tool used for crack/seam on surface of object in Embodiment 1.

As shown in FIG. 1-FIG. 3, a glue perfusing part in tight fit with the needle 110 of the injector 109 is arranged on the top surface of the saucer 101 in the position corresponding to the perfusion repairing area 115 on the bottom surface of the saucer 101; annular grooves are arranged in the glue applying areas on the bottom surface of the saucer 101, and the annular grooves are peripherally distributed along the perfusion repairing area 115 of the saucer 101.

Specifically, the saucer 101 is in the shape of a circular disk; the annular grooves and the bulged lines are all in the shape of a circular ring; and the centers of annular grooves and the bulged lines are all in the position of the center of the saucer 101; wherein, the annular grooves comprise a first annular groove 104, a second annular groove 105 and a third annular groove 106 in concentric distribution from the inner ring to the outer ring in order; the bulged lines comprise a first bulged line 107 and a second bulged line 108; the first bulged line 107 is arranged between the first annular groove 104 and the glue perfusing part, and the second bulged line 108 is arranged between the first annular groove 104 and the second annular groove 105; accordingly, according to the area of the crack/seam on the surface of object 111, the adhesive glue 112 is applied in the annular grooves in the area corresponding to the glue applying areas of the saucer 101.

For example, when the crack/seam on the surface of object 111 has a bigger area, the adhesive glue 112 can be applied in the outer area of the second bulged line 108 on the outer ring; when the crack/seam on the surface of object 111 has a smaller area, the adhesive glue 112 can be applied in the area between the second bulged line 108 on the outer ring and the first bulged line 107 on the inner ring.

In the embodiment, the saucer 101, the annular grooves and the bulged lines can also be designed in other shapes; for example, the saucer 101 can be square, etc, and the annular grooves and the bulged lines can be in the shape of square ring, etc., respectively. The designed quantities of the annular grooves and the bulged lines can be increased or reduced according to the actual conditions in use; for example, the quantity of the annular grooves can also be 1, 2 or 4, etc., and the quantity of the bulged lines can also be 1, 3 or 4, etc.

At the same time, the glue perfusing part comprises a saucer sleeve 102 and a valve core 103; the saucer sleeve 102 is fixedly arranged on the top surface of the saucer 101, and is provided with a through hole communicated with the perfusion repairing area 115 of the saucer 101; the valve core 103 is arranged in the through hole, and is in sealing connection with the sealed sleeve. In the processes of pumping, perfusing repairing liquid 113 and perfusing air, the needle 110 can penetrate to the perfusion repairing area 115 through the valve core 103, and can better guarantee the tightness of the perfusion repairing area 115 after the needle 110 is extracted; wherein, preferably, the needle 110 fit with the valve core is preferred to be a round-ended needle. It shall be noted that the valve core 103 is the valve core in the existing structure, and the embodiment will not describe its specific structure in detail.

As the preferable specification sizes of the embodiment, the annular grooves are all 2 mm wide and 0.5 mm deep; the bulged lines are 1 mm deep and 0.5 mm high; the saucer 101 has the diameter length of 10 cm and thickness of 2 mm; the first bulged line 107 has the diameter length of 3 cm, and the second bulged line 108 has the diameter length of 6 cm; the first annular groove 104 has the diameter length of 46 mm, the second annular groove 105 has the diameter length of 75.5 mm, and the third annular groove 106 has the diameter length of 88.5 mm.

Embodiment 2

The embodiment makes improvements for the vacuum repairing tool used for crack/seam on surface of object in Embodiment 1, a jacking device used for jacking the object 111 back to split the crack/seam on surface of object is added on the basis of Embodiment 1, so that on completion of perfusion, by jacking the jacking device on the back of object 111 in the position corresponding to the crack/seam on the surface of object 111, the crack/seam on the surface of object 111 can be split to a limited extent, which can be better for the repairing liquid 113 in the perfusion repairing area 115 to completely permeate to every place of the crack/seam.

Preferably, the jacking device is provided with a tapered head; in this way, since the tapered head is sharper, it has higher pertinence in jacking, accordingly, it is not only good for observing the splitting of the crack/seam and the permeation of the repairing liquid 113, it can also be pertinent to the tiny crack/seam impermeable for the repairing liquid 113; besides, the tapered head can slightly split the crack to reduce the risks of the crack being expanded and the surface of object 111 being damaged.

Specifically, as shown in FIG. 5-FIG. 8, the jacking device comprises a trident bracket 120, a threaded rod 121, a tapered head 123 and a hand valve 122; the three ends of the trident bracket 120 are arranged on the suckers 124 used for sucking and fixed onto the back of object 111; the body of the trident bracket 120 is provided with a threaded through hole, and the inner wall of the threaded through hole has threads matched with the threaded rod 121; the bottom end of the threaded rod passes through the threaded through hole and matches with the threads; the hand valve 122 is arranged on the top of the threaded rod 121, the tapered head 123 is arranged at the bottom of the threaded rod 121, so that the hand valve 122 can be rotated to control the threaded rod 121 to screw in/out and then control the tapered head 123 to withdraw/stretch.

Figure 9:
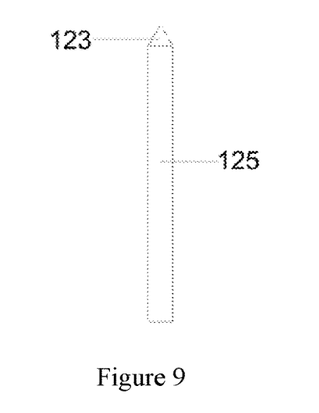
FIG. 9 shows the structural diagram of the ejecting pen in Embodiment 2.

In the embodiment, other jacking devices with the structure of tapered head can also be selected, such as an ejecting pen 125; as shown in FIG. 9, the ejecting pen 125 comprises a pen rod and a tapered head arranged at the front end of the pen rod; preferably, the ejecting pen 125 is a cylinder made of nylon material with a tapered head at one end.

Figure 4:
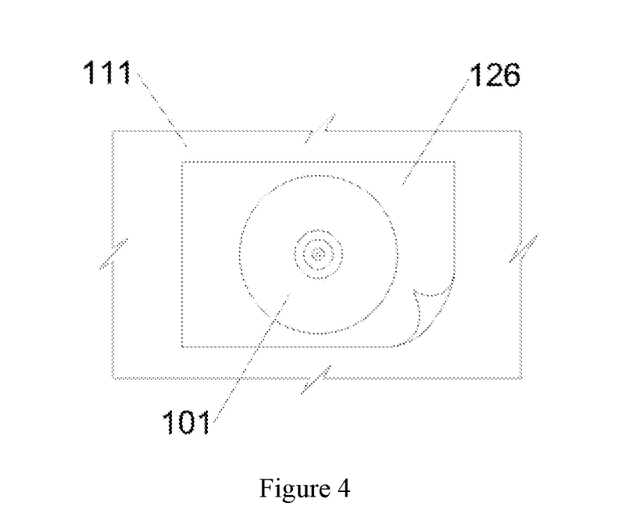
FIG. 4 shows the schematic diagram for the using state of the adhesive film in the embodiment.
Figure 5:
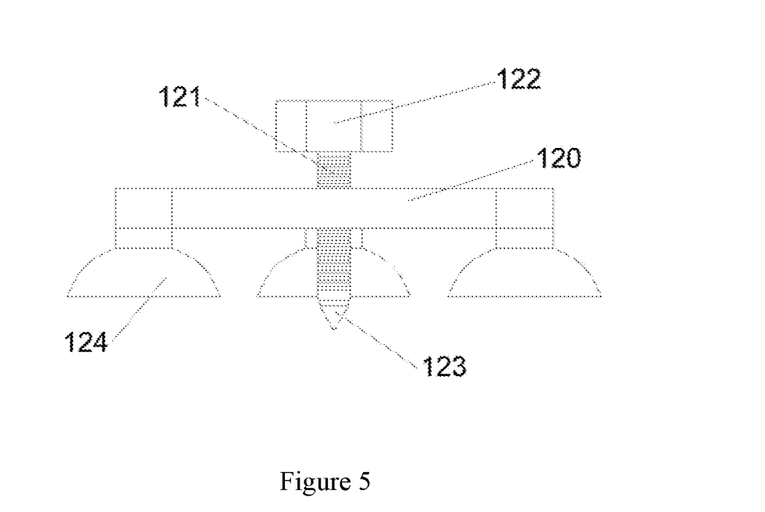
FIG. 5 shows the side view of the jacking device in Embodiment 2.
Figure 6:
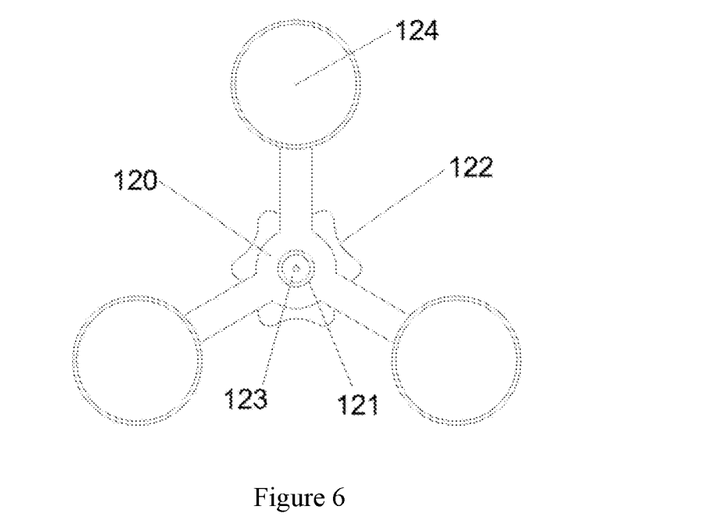
FIG. 6 the upward view of the jacking device in Embodiment 2.
Figure 7:
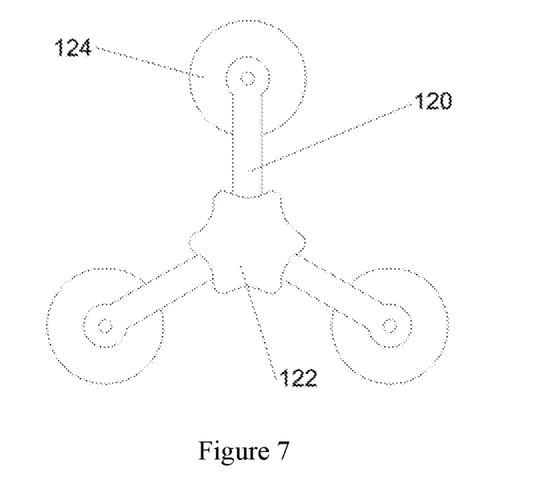
FIG. 7 the top view of the jacking device in Embodiment 2.
Figure 8:
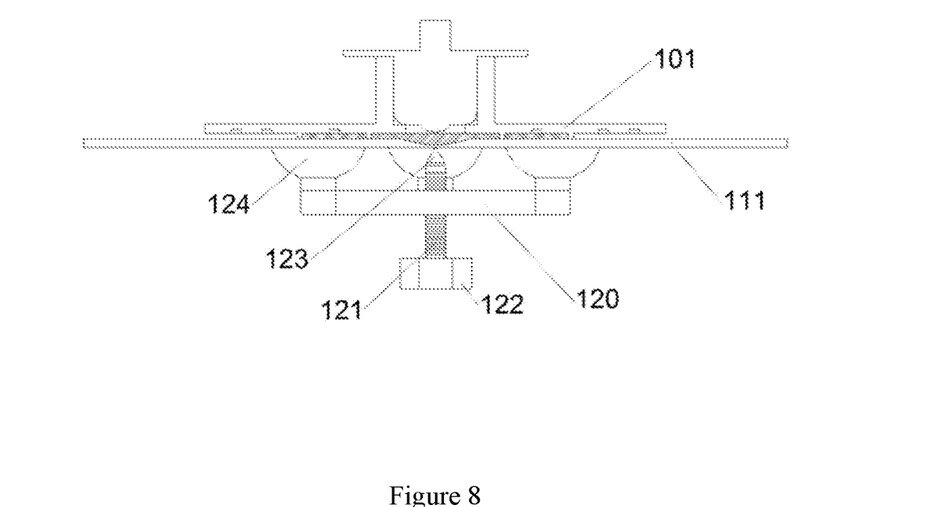
FIG. 8 shows the schematic diagram for the using state of the vacuum repairing tool used for crack/seam on surface of object in Embodiment 2.

The vacuum repairing tool used for crack/seam on surface of object in the above embodiment also comprises an adhesive film 126 used for adhering on the surface of object 111; as shown in FIG. 4, when in use, the adhesive film 126 can be adhere to the surface of object 111, and the part on the adhesive film 126 corresponding to the crack/seam on the surface of object 111 is cut away using a blade to expose the crack/seam on the surface of object 111; then the sticky pad is adhered and cemented onto the adhesive film 126 to repair the crack/seam on the surface of object 111; in this way, in the process of repairing, the adhesive film 126 arranged between the surface of object 111 and the sticky pad can avoid the adhesive glue 112 from directly adhering to the object 111 and then avoid the problem that it is difficult to completely remove the adhesive glue 112 on completion of repairing, and it can ensure to have not any residual outside the repair area.

In the above embodiment, the sticky pad can also comprises a gasket 114 only; or the sticky pad comprises both a saucer 101 and a gasket 114; as a result, it can better repair longer straight cracks and curved cracks through the gasket 114; wherein, the needle 110 used for penetrating the gasket 114 is preferred to be a sharp needle.

Figure 10:
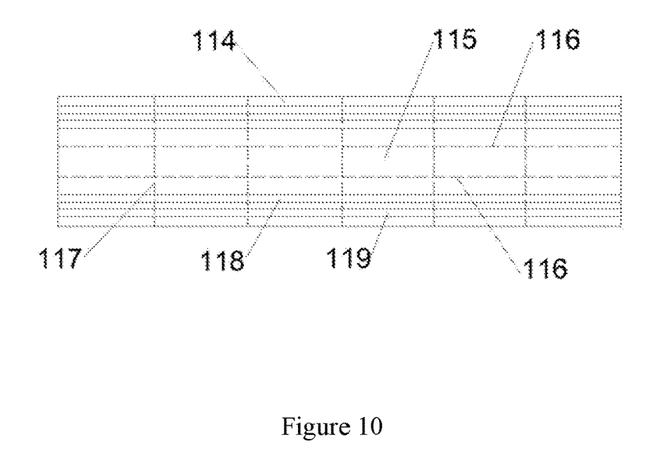
FIG. 10 shows the structural diagram of the paster in the embodiment.
Figure 11:
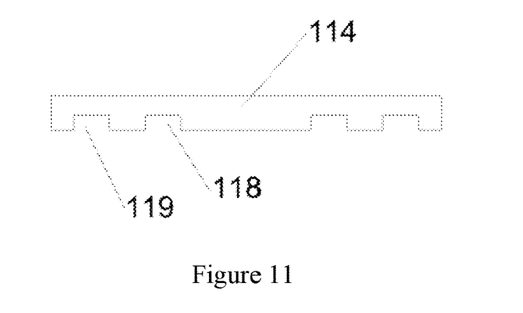
FIG. 11 shows the cross-sectional diagram of the paster in the embodiment.

As shown in FIG. 10 and FIG. 11, glue applying areas are arranged on the two opposite sides of the perfusion repairing area on the bottom surface of the gasket 114, respectively; the glue applying areas of the gasket 114 are provided with strip-shaped grooves used for filling glue, and the strip-shaped grooves are arranged in the length direction of the gasket 114.

Specifically, the gasket 114 is rectangular; the strip-shaped grooves comprise a first strip-shaped groove 118 and a second strip-shaped groove 119 in parallel, and the second strip-shaped groove 119 is arranged on the outer side of the first strip-shaped groove 118.

Preferably, a transverse silk-print dotted line 116 is arranged on each of the two opposite sides of the perfusion repairing area 115 on the bottom surface of the gasket 114, respectively, and used for dividing the perfusion repairing area 115 and the glue applying area; at the same time, multiple longitudinal silk-print dotted lines 117 used for equally dividing the gasket 114 along the length direction are also arranged on the bottom surface of the saucer 101, so that it is convenient to cut the gasket 114 along the longitudinal silk-print dotted lines 117 according to the actual size in use.

As the preferable size specifications of the gasket 114, the gasket 114 is 100 cm long, 10 cm wide and 2 mm thick; the strip-shaped grooves are all 2 mm wide and 0.5 mm deep; at the same time, the quantity of the longitudinal silk-print dotted lines 117 is 9 to equally divide the gasket 114 into 10 parts along the length direction.

In the above embodiment, the adhesive film 126 is a transparent plastic film with back glue; the gasket 114 and the saucer 101 are both made of semi-transparent silica gel or rubber materials, respectively; at the same time, the pumping injector and the perfusing injector can be either the same injector or the special injectors separately used aiming at the corresponding processes; the size specifications of the saucer 101 and the gasket 114 include, but not limited to, the above preferable size specifications, and the size specifications of the saucer 101 and the gasket 114 can be adaptively adjusted according to the actual conditions in use.

The above are only the specific embodiments of the invention, but to which the protective range of the invention is not limited, and any easily accessible variation or alternate for the technicians familiar with the technical field within the technical scope disclosed by the invention shall be covered within the protective range of the invention.

What is claimed is:

1. A vacuum repairing tool used for a crack/seam on a surface of an object, comprising:
    an injector used for extracting air and injecting glue and a sticky pad used for fixing on the surface of the object; and
    a perfusion repairing area corresponding to the crack/seam and glue applying areas used for applying the glue arranged on a bottom surface of the sticky pad, and the glue applying areas being on outer sides of the perfusion repairing area,
    wherein the injector is provided with a needle used for puncturing the sticky pad and in close fit with a punched opening in the sticky pad.

2. The vacuum repairing tool according to claim 1, wherein the sticky pad comprises a saucer and/or a gasket;
    wherein the glue applying areas are arranged on two opposite sides of the perfusion repairing area on a bottom surface of the gasket, respectively; the glue applying areas of the gasket are provided with strip-shaped grooves used for filling the glue, and the strip-shaped grooves are arranged in a length direction of the gasket;
    wherein a glue perfusing part in tight fit with the needle of the injector is arranged on a top surface of the saucer in a position corresponding to the perfusion repairing area on a bottom surface of the saucer; annular grooves are arranged in glue applying areas on the bottom surface of the saucer, and the annular grooves are peripherally distributed along the perfusion repairing area of the saucer.

3. The vacuum repairing tool according to claim 2, wherein bulged lines are also arranged on the bottom surface of the saucer; the bulged lines are peripherally distributed along the perfusion repairing area of the saucer, and the bulged lines are concentrically arranged with the annular grooves.

4. The vacuum repairing tool according to claim 3, wherein the glue perfusing part comprises a saucer sleeve and a valve core; the saucer sleeve is fixedly arranged on the top surface of the saucer, and is provided with a through hole communicated with the perfusion repairing area of the saucer; the valve core is arranged in the through hole, and is in sealing connection with the sealed sleeve.

5. The vacuum repairing tool according to claim 3, wherein the annular grooves comprise a first annular groove, a second annular groove and a third annular groove in concentric distribution from an inner ring to an outer ring in order; the bulged lines comprise a first bulged line and a second bulged line; the first bulged line is arranged between the first annular groove and the glue perfusing part, and the second bulged line is arranged between the first annular groove and the second annular groove.

6. The vacuum repairing tool used according to claim 5, wherein the gasket is rectangular; the saucer is in the shape of a circular disk; the annular grooves and the bulged lines are all in the shape of a circular ring; and the centers of annular grooves and the bulged lines are all in the position of the center of the saucer.

7. The vacuum repairing tool according to claim 6, wherein the annular grooves and the strip-shaped grooves are all 2 mm wide and 0.5 mm deep; the bulged lines are 1 mm deep and 0.5 mm high.

8. The vacuum repairing tool according to claim 7, wherein the saucer has the diameter length of 10 cm and thickness of 2 mm; the first bulged line has the diameter length of 3 cm, and the second bulged line has the diameter length of 6 cm; the first annular groove has the diameter length of 46 mm, the second annular groove has the diameter length of 75.5 mm, and third annular groove has the diameter length of 88.5 mm.

9. The vacuum repairing tool according to claim 1, further comprising an adhesive film used for adhering on the surface of the object.

10. The vacuum repairing tool according to claim 1, further comprising a jacking device used for jacking the object back to split the crack/seam on surface of the object.

* * * * *